United States Patent [19]

Moulding, Jr. et al.

[11] Patent Number: 5,110,008

[45] Date of Patent: May 5, 1992

[54] DISPENSER ADAPTED TO ISOLATE THE DISPENSED OBJECTS BY COMPRESSION BETWEEN TWO MOVEABLE STRUCTURES

[76] Inventors: Thomas S. Moulding, Jr., 214 Via La Soledad, Redondo Beach, Calif. 90277; Donald G. Ellis, Geneva Park, Boulder, Colo. 80302

[21] Appl. No.: 414,454

[22] Filed: Sep. 29, 1989

[51] Int. Cl.$^5$ .............................................. B65G 59/00
[52] U.S. Cl. .................................. 221/259; 221/268; 221/15
[58] Field of Search ................... 221/7, 13, 14, 15, 64, 221/259, 260, 268, 277, 263

[56] References Cited

U.S. PATENT DOCUMENTS

| | | | |
|---|---|---|---|
| 479,688 | 7/1892 | Weller | 221/176 |
| 1,452,721 | 4/1923 | Antoine | 221/64 |
| 2,167,049 | 7/1939 | Maurath et al. | 198/43 |
| 2,408,686 | 10/1946 | Bush | 10/5 |
| 2,630,245 | 3/1953 | Maier | 222/10 |
| 2,923,436 | 2/1960 | Koehn | 221/265 |
| 3,063,596 | 11/1962 | D'Autheville et al. | 221/7 |
| 3,065,879 | 11/1962 | Jennings et al. | 221/233 |
| 3,105,609 | 10/1963 | Salfisberg | 221/176 |
| 3,215,310 | 11/1965 | Hurst et al. | 221/7 |
| 3,241,712 | 3/1966 | Sacchetti et al. | 221/265 |
| 3,392,881 | 7/1968 | Eriksen | 221/259 |
| 3,860,111 | 1/1975 | Thompson | 206/534 |
| 3,991,908 | 11/1976 | Thomas et al. | 221/154 |
| 4,018,358 | 4/1977 | Johnson et al. | 221/7 |
| 4,128,188 | 12/1978 | White | 221/91 |
| 4,163,507 | 8/1979 | Bell | 221/2 |
| 4,273,254 | 6/1981 | Cuppleditch et al. | 221/196 |
| 4,460,106 | 7/1984 | Moulding, Jr. et al. | 221/7 |
| 4,523,694 | 6/1985 | Veltri | 221/265 |
| 4,573,606 | 3/1986 | Lewis et al. | 221/2 |
| 4,648,529 | 3/1987 | Blakemore et al. | 221/1 |
| 4,733,797 | 3/1988 | Haber | 221/8 |

FOREIGN PATENT DOCUMENTS

| | | |
|---|---|---|
| 1916304 | 3/1969 | Fed. Rep. of Germany . |
| 1171839 | 4/1957 | France . |
| 253231 | 12/1925 | Italy . |
| 189285 | 12/1960 | Sweden . |
| 1411952 | 9/1972 | United Kingdom . |

Primary Examiner—Robert P. Olszewski
Assistant Examiner—Kenneth Noland

[57] ABSTRACT

A medication dispenser for dispensing pills, tablets, capsules, or the like, one at a time from a receptacle in which the medication is arranged loosely to allow for easy filling. In one embodiment, the medication units are passed through a restricted funnel opening, one at a time, and then captured between two cooperating, movable, compressible structures such as wheels, belts, or the like, which move the units to a detector that counts the units as they are removed from the dispenser. In another embodiment, the medication is first captured and then moved through a restricted opening. The dispenser may also include a computer for controlling and/or recording the time of dispensing and the quantity of medication dispensed. Additionally, the dispenser may include two sequentially placed sets of cooperating, movable, structures at different horizontal levels for achieving greater separation of medication units.

100 Claims, 6 Drawing Sheets

DISPENSER ADAPTED TO ISOLATE THE DISPENSED OBJECTS BY COMPRESSION BETWEEN TWO MOVEABLE STRUCTURES

BACKGROUND OF THE INVENTION

This invention relates to an apparatus for dispensing objects from a container, and more particularly to dispensing medication, held loosely in a container, to a patient.

As medical treatment becomes increasingly dependent on a large number of medications, the problem of these medications not being taken or not being given according to the prescription has increased to enormous proportions. Within hospitals, medication errors are frequent, sometimes resulting in tragic consequences. On an outpatient basis, the problem is much worse with patients frequently failing to take medication or taking excessive amounts of medication. Often neither the patient nor the medical care provider knows what the patient has taken. The magnitude of this problem was laid out five and a half years ago in a joint committee hearing by the U.S. Senate Special Committee on Aging and the Subcommittee on Health and Long Term Care of the Select Committee on Aging, U.S. House of Representatives on Jun. 28, 1983. The extensive dimensions of the problem were reemphasized four years later on Oct. 1, 1987 when the Commissioner of the Food and Drug Administration, and the Assistant Secretary for Health of the U.S. Public Health Service held a news conference in which they pointed out that 1.6 billion prescriptions are dispensed annually in the United States and that twice as many prescriptions are filled for people over 65 as are filled for younger people. They further pointed out that nearly 25% of older persons' hospital admissions are due to problems with taking prescriptions incorrectly and 23% of nursing home admissions are the result of older people being unable to take medicine properly.

Patients living at home are often left with the responsibility of following directions to take medication. In addition to those circumstances where such patients intentionally fail to follow the instructions, such patients, especially feeble minded or elderly patients, often forget to take the medicine, take the wrong amount of medication, take the medication at the wrong time, take one medication according to the instruction for another medication, etc. To help solve this problem devices called medication monitors have been developed which record and control when medication has been removed from a container. Most of the medication monitors for solid units of medication such as pills, tablets or capsules usually require that someone spend considerable time filling the device, which makes them relatively impractical in routine use. Some devices consist of multiple receptacles that are each filled by hand, with each receptacle containing medication to be administered at different points in time. The use of such devices is time consuming. This problem of filling the receptacles is sufficiently daunting that one device has been commercially introduced that only records that the cover of the device has been opened, not how much, if any, medication has been removed.

Another problem faced by the elderly is the difficulty in manipulating mechanical devices due to arthritis, neurologic impairment, or inability to learn a sequence of steps. Thus, ideally a dispensing device for patients so afflicted should dispense medication without the patient having to handle the device or at least with minimal handling.

Other attempts have been made to create devices that dispense articles one at a time, but these devices tend to have unique characteristics for the type of object being dispensed. For example, the device of U.S. Pat. No. 3,392,881 entitled "Device for Dispensing Fish", issued Jul. 16, 1968 to Eriksen, has foam rubber wheels which rotate to pass a fish between them, however, this device does not demonstrate that contact between the wheels and fish consistently move the fish. Instead it achieves this objective by having portions of the wheels cut to allow the passage and to grip the head of the fish and by providing an additional element, a spike, that is used to grip and move the fish. This type of device is not suitable for medication dispensing, since pills, tablets and capsules are much smaller than fish and vary considerably in size, some being more than six (6) times the size of others. Also, a spike could crush the medication as it passed through the wheels.

It is thus apparent that there is a need in the art for an improved method or apparatus which will dispense pills, tablets, capsules or the like one unit at a time so that the amount dispensed can be easily recorded. Another need in the art is for such a dispenser that allows the medication to be placed in a single receptacle in which it is loosely arranged, so that the receptacle can be quickly and easily filled. Still another need in the art is for a device that will dispense medication only at predetermined times and only in predetermined amounts to regulate the administration of the medication and to prevent patients that have forgotten to take medication from taking large doses to "catch up".

SUMMARY OF THE INVENTION

It is an object of the present invention to dispense medication units such as pills, tablets, capsules or the like.

It is another objective to dispense the medication one unit at a time.

It is still another object of the present invention to record the number of medication units dispensed each time dispensing occurs.

Another object is to prohibit dispensing when the number of medication units dispensed within a certain period of time reaches a certain number.

It is a further object to allow dispensing only at predetermined times.

Yet another object of the invention is to provide a medication storage receptacle that allows the medication units to be loosely arranged therein, with no particular order required.

Another object is to accept data that defines how much medication is to be dispensed within each time interval.

Another object is to allow the dispenser to be separated from the system that determines when and how much medication to dispense from the dispenser.

Still another object of the present invention is to provide an audible reminder of when the medication should be dispensed.

A still further object of the present invention is to provide a visual display to indicate the time when medication is to be dispensed and the amount of medication to be dispensed.

Still another objective is to dispense medication with minimal or no manipulation of the device by the patient.

The above and other objects are accomplished in a dispensing device having a receptacle for loosely storing medication units such as pills, tablets, capsules, or the like. The receptacle is connected to a passageway through which the medication units travel to the outside of the dispenser. Within the passageway is a medication unit isolator having the shape of a wheel, belt or the like in a second embodiment. This isolator is movable, either by a motor or hand-crank, to direct and assist the travel of medication units through the passageway. The isolator contains compressible material on its surface, or it may be made completely of compressible material, so that the medication units are non-slippingly engaged, while not being crushed. The isolator thus is able to isolate and move single medication units for dispensing through the passageway.

To further increase the likelihood of selecting single medication units, a second movable isolator may be located at the exit of the first movable isolator. This second isolator may move more rapidly than the first isolator, thereby further insuring that single units of medication are isolated.

The entrance into the passageway may have a restriction to prevent more than one medication unit from entering the passageway, or the passageway itself may form the restriction. Also, an anti-jamming mechanism may be placed at the entrance to the passageway to prevent jamming of the medication units and to increase the ability of the device to select single units for travel through the passageway. As each medication unit transits the passageway, a detector within or at either end of the passageway detects and counts each medication unit. The medication unit exits the passageway through a gate that prevents the medication unit from reentering the passageway, as well as preventing moisture or debris from entering the passageway.

The dispenser may also contain a control and memory system, as well as a clock, to allow the dispensing of medication only at predetermined times and in predetermined amounts. A communication system may be included with the dispenser to allow the time and dosage information to be inputted to the dispenser or to record information regarding the times and amounts of medication dispensed. This control, memory and communication system could optionally be located in a central location to allow simultaneous control of multiple dispensers to dispense multiple types and amounts of medication.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Generally, the dispenser uses compressible material, such as foam rubber, on a movable isolator or isolators, such as disks, belts, or segments of disks, which cooperate with each other or with a solid wall to remove objects one at a time from a container in which the objects are loose and not arranged in any order. The compressible material allows the dispenser to adjust easily for use with different sized objects and essentially removes the possibility that the dispenser will crush the objects. The objects can be medication, such as pills, tablets, capsules or the like, or any other object that is small enough to be held and moved by the compressible surface.

The dispenser may include some type of guiding means for directing the medication units to a restricted space, such as the exit opening of a funnel, so the objects are presented to the compressible structures one at a time and are removed from the dispenser one at a time. Alternatively, the objects are presented to the compressible movable isolators inside the container which move the objects individually out of the container, through an opening therein.

The first embodiment of the dispenser, illustrated in FIGS. 1 through 7, includes a receptacle 12 for loosely storing medication such as pills, tablets, capsules, or the like 22. The receptacle 12 is connected to a funnel 14. The narrow end of the funnel 14 acts as a restriction to prevent more than one pill 22 from being dispensed at one time. The funnel 14 feeds a pill 22 to a movable compressible isolator having the shape of wheel segments 26, 28, which are movable to direct pills 22 emerging from the relatively small exit opening of the funnel 14 toward the outside of the device. The wheel segments 26, 28 each rotate about parallel axes spaced such that the peripheral surface of each wheel segment 26, 28 tangentially contacts the peripherals surfaces of the other wheel segment 26, 28. The wheel segments 26, 28 contain compressible material 30, 32 on their surfaces so that the pills 22 are non-slippingly engaged between the wheel segments 26, 28 yet are not being crushed.

Figure 1:
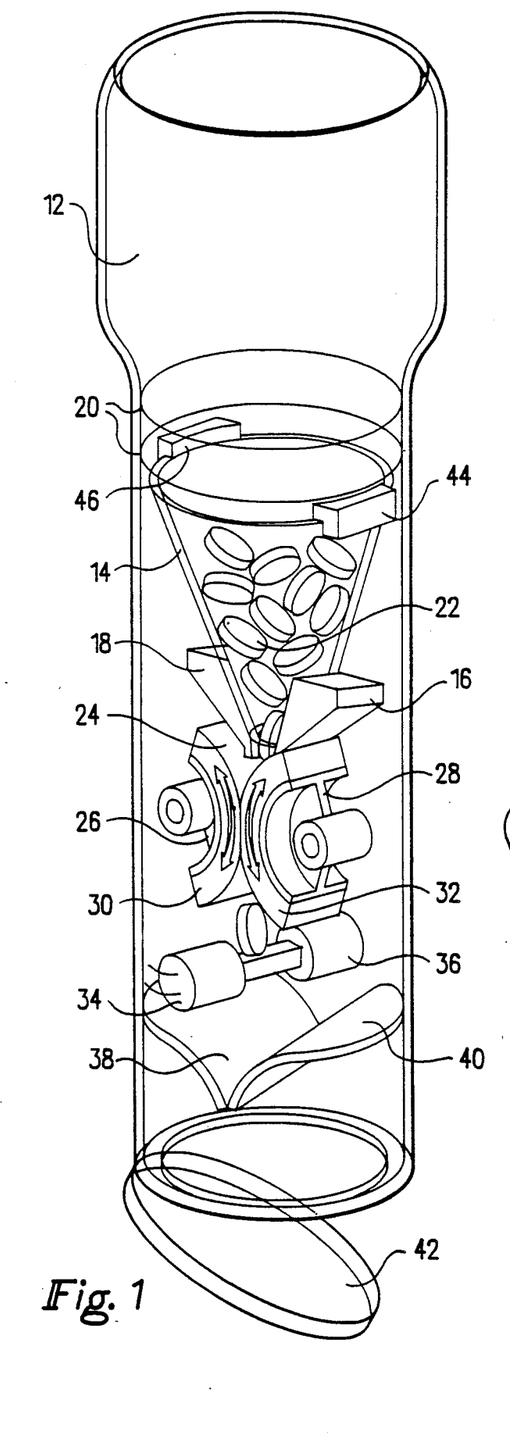
FIG. 1 is a perspective view of one embodiment of the dispenser in which a funnel serves as the restriction device and two wheel segments serve as the movable compressible isolator.

As the wheel segments are rotated about their axes, either by hand-crank or a motor (not shown), a pill 22 transits through the isolator and passes between a light source 34, and photodetector 36 which detects the passage of the pill 22. The pill 22 then exits through a gate 38, 40 that prevents the pill 22 from reentering the funnel 12, as well as prevents moisture or debris from entering the funnel 12. The wheel segments 26, 28 can be prevented from rotating by a control system that regulates the time and amount of pills 22 being dispensed.

Referring now to FIG. 1 in more detail, a medication dispenser 10 is shown having a receptacle 12 which is designed to hold the medication, such as pills, tablets, capsules or the like 22, in a loose fashion. This receptacle 12 may typically be a conventional medication bottle placed in an inverted position. The receptacle 12 is attached to the dispenser 10 typically using a screw thread arrangement, indicated by rings 20, although there are many other ways of attaching the receptacle 12 to the dispenser 10. A deformable funnel 14 is held in place below the receptacle 12 by two hold down cleats 44 and 46 and two compression blocks 16 and 18. Medication units, such as pills 22 are guided by the funnel 14 through the exit opening 24, which is just large enough to allow one pill 22 to pass through at one time. Two compression blocks 16, 18 are used to compress the funnel 12 into different shapes for different sizes and shapes of medication as will be described in more detail with respect to FIGS. 6 and 7. Two compressible wheel segments 26 and 28, are in contact with each other and cooperate with each other by rotating together to transfer a pill 22 from the opening 24 in the funnel 14 to the exterior of the dispenser 10. The wheel segments 26 and 28 have compressible coverings 30 and 32 respectively, that are flexible enough to allow a pill 22 to make a depression in the compressible material and to pass between the coverings 30 and 32 of the wheel segments 26 and 28 as wheel segments 26 and 28 are rotated without crushing the pill 22, even though the coverings 30 and 32 of the wheel segments 26 and 2 make contact with each other when nothing is between them. This contact prevents pills from being dispensed unless the wheel segments 26 and 28 are rotated.

Arrows are drawn on the compressible material 30, 32 to indicate direction of rotation. The dark arrow indicates the direction of rotation when dispensing a pill 22, and the light arrow indicates the direction of rotation used to return the wheel segments 26, 28 to a position for dispensing another pill 22.

Figure 2:
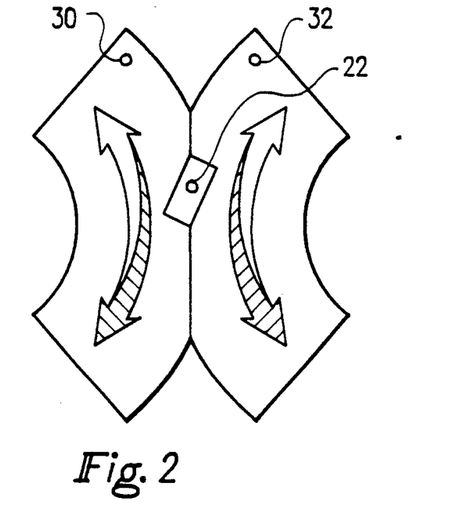
FIG. 2 is a side view of a medication unit interposed and compressed between the sides of the movable compressible isolator shown in FIG. 1.

FIG. 2 shows a side view of the coverings 30, 32 transporting a pill 22. These coverings 30, 32 are fashioned of a compressible material that has a high coefficient of friction with the pills 22. FIG. 2 illustrates how a pill 22 is compressed between the coverings 30, 32 so as to create a discrete depression or indentation in the coverings 30, 32 to transport pill 22 between them as the wheel segments 26, 28 are rotated.

Returning to FIG. 1 it can be seen that after passing between the wheel segments 26 and 28, a pill 22 drops between a light source 34 and a photodetector 36, which detects the presence of the pill 22. The light source 34 and the detector 36 are carefully positioned so that a pill 22 is detected immediately after it has moved past the coverings 30, 32, and is no longer captured between them and therefore is free to be removed from the dispenser 10. To adapt the dispenser 10 to different size objects, the light source 34 and detector 36 can be made movable so that the person filling the dispenser can adjust the spacing between them and the wheel segments 28 and 30 in order to detect an object as soon as it has passed the coverings 30, 32. Alternatively, one can use a relatively wide light beam and a correspondingly sized detector, and introduce a movable mask or aperture plate (not shown) with a small hole or aperture that can be positioned over the detector 36 so that effectively a narrow beam reaches the detector 36. If this is done, the person filling the dispenser 10 can adjust the position of the mask and aperture so that the light beam and detector system detects the object as soon as it is no longer captured by the coverings 30, 32.

A recording and counting circuit (not shown) attached to the photodetector 36 can be used to count and record the pills 22 dispensed. A control circuit or system (not shown) interconnected to the counting circuit can be used to prevent further dispensing of medication by activating a clutch (not shown) which is attached to the axes of the wheel segments 26 and 28. A timer or clock (not shown) can also be used by the control system to allow dispensing only at predetermined times and to detect the time when medication is dispensed.

After passing the detector 36, the pill passes doors 38, 40 to prevent the pill 22 from retracing its path back through the detector 36 a second time. Finally, the pill 22 passes out through a bottom opening in the dispenser 10 normally covered by a hinged waterproof cover 42, which would be opened in order to dispense medication. The cover 42 is spring biased to a closed position covering the bottom opening, and is opened by the patient when dispensing occurs.

Should two pills 22 jam the funnel opening 24, the patient would invert the dispenser 10 and tap the dispenser 10 to dislodge the jam. The funnel 14 and the side walls of the dispenser 10 are made of transparent material so that a jam can be seen by the patient.

The two doors 38, 40 of the one way gate could be fashioned of two thin flexible plastic leaves which would separate in response to the weight of the object. If the leaves were sufficiently thin, even a very light object would open and drop through the doors 38, 40 when the dispenser 10 is operated. Alternatively, the doors 38, 40 could be made of light weight rigid material held together under light spring tension that would open in response to the weight of the pill 22.

The one way gate formed by the doors 38, 40 is needed so that if an object is not removed from the dispenser 10 after passing through the detector 36, there can be no second detection of the object by the light beam and photodetector 36.

Figures 3, 4:
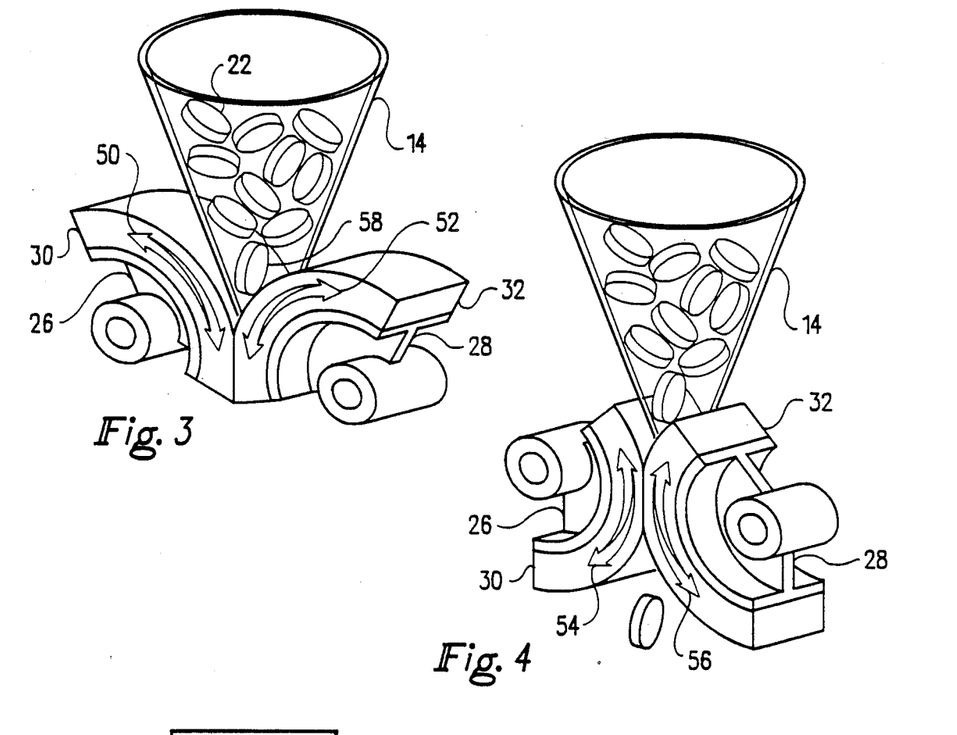
FIG. 3 illustrates the dispenser shown in FIG. 1 at the start of the dispensing cycle.
FIG. 4 illustrates the dispenser shown in FIG. 1 at the end of the dispensing cycle with a medication unit being dispensed.

FIG. 3 illustrates the wheel segments 26, 28 in a position to receive a pill 22 from the funnel 14. The wheel segments 26, 28 are rotated as far as possible in the direction of the light arrows 50, 52, and a pill 58 is positioned at the opening of the funnel 14 and the pill 58 just touches the compressible coverings 30, 32.

FIG. 4 illustrates the wheel segments 26, 28 at the point where the pill 58 has passed between the wheel segments 26, 28. The wheel segments 26, 28 have been rotated fully in the direction of dark arrows 54, 56. The pill 58 has moved from the funnel opening 24 as shown in FIG. 3, between the compressible coverings 30, 32 as the wheel segments 26 and 28 were rotated, to drop towards the exterior of the dispenser 10.

With the arrangement as shown in FIGS. 1 through 4, it is possible that the patient might turn the wheel segments 26, 28 rapidly and remove two or three pills when he only desires to remove on pill. A clutch (not shown) is included between the turning means, such as a hand-crank or motor (not shown), to avoid this problem. The control system (not shown), would disengage the wheel segments 26, 28 from the turning means by activating the clutch after a pill has been detected by the photodetector 36. This would cause the wheel segments 26, 28, which are biased by a spring (not shown), to return to the position of FIG. 3. The clutch would also disengage the turning means from the wheel segments 26, 28 when they have reached the position shown in FIG. 4, to protect from over-rotation and breakage. The clutch would also be used by the control system to disengage the turning mechanism from the wheel segments 26, 28 after the correct amount of medication has been dispensed for a particular time period.

Occasionally, an object might be captured by the compressible coverings 30, 32 and not be released when the wheel segments 26, 28 reached the position shown in FIG. 4. When the wheel segments 26, 28 return to the position shown in FIG. 3, the object would be returned to the funnel 14 to be dispensed on the next rotation. If the object caught the edges of the opening 24 to the funnel 14 and failed to reenter the funnel 14, the compressible coverings 30, 32 would move around the object and leave it captured between the compressible coverings 30, 32, but outside the funnel 14. On the next rotation of the wheel segments 26, 28, the captured object would be discharged towards the exterior of the dispenser.

Figure 5:
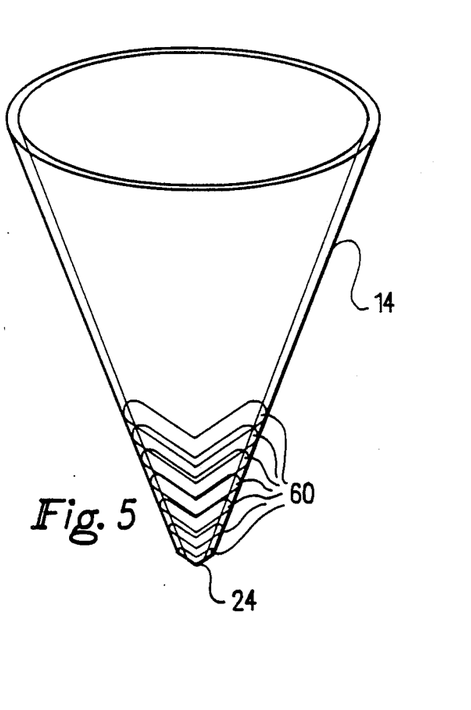
FIG. 5 is a perspective view of a funnel having an orifice of selectable restricting sizes for use as the restriction device.

The funnel 14 can be adjusted to allow for different sizes and shapes of medication. FIG. 5 shows the funnel 14 and depicts a series of "cut off lines" 60 near the apex of the funnel 14 which forms the opening of the funnel 14. The cut off lines 60 are curved so that the opening 24 of the funnel 14 will fit into the curved inlet created by the two compressible coverings 30, 32. To facilitate separation at the cut off lines 60, these lines could be formed by perforations or made with a thin plastic so that the funnel 14 could be torn along one of the cut off lines 60. A calibration chart could be given to the pharmacist to indicate which line to cut for a particular medication.

Figure 6:
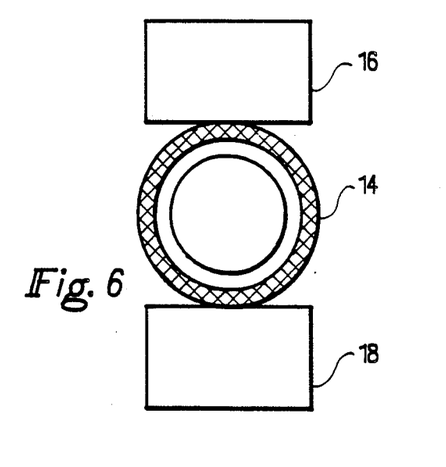
FIG. 6 is a bottom view of the narrow end of the funnel adapted for use in dispensing capsules.
Figure 7:
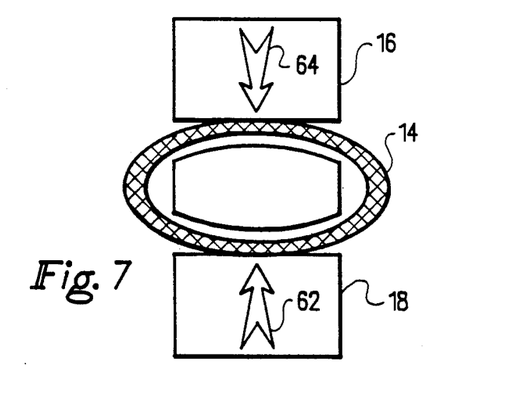
FIG. 7 is a bottom view of the narrow end of the funnel compressed and deformed for use in dispensing pills or tablets.

The funnel 14 is held in position with hold down cleats 46, 44 and with compression blocks 16, 18 (FIG. 1). The narrow end or apex of the funnel 14 can be selectively compressed to any extent needed with the funnel compression blocks 16, 18 according to the type of object being dispensed. FIG. 6 illustrates a bottom view of the funnel 14 at the level of the compression blocks 16, 18 in a full outward position, such as would be suitable for medication with a circular cross section, such as capsules. FIG. 7 shows the funnel 14 compressed inward by the compression blocks 16, 18, to a position suitable for medication such as tablets which are oblong, not circular, in cross section.

In order to reduce the overall cost of the dispenser when patients are taking multiple medications, it is desirable to use one control and recording system to dispense medication from multiple containers. Medication containers could be interconnected to a central control system. This central control system could control dispensing of medication from several dispensers, allowing the dispensing of various types of medications at various times.

A second embodiment of the dispenser, illustrated in FIGS. 8 through 18, includes a receptacle 102 for storing the objects to be dispensed. The receptacle 102 is connected to a reservoir one side of which possesses an opening that allows the objects to pass through to the outside of the dispenser when propelled by the movable isolator. This dispenser is kept stationary and does not have to be manipulated by the patient, which makes it particularly useful for patients who are confined a home and unable to manipulate a dispensing device because of senility, arthritis or neurologic problems.

Figure 8:
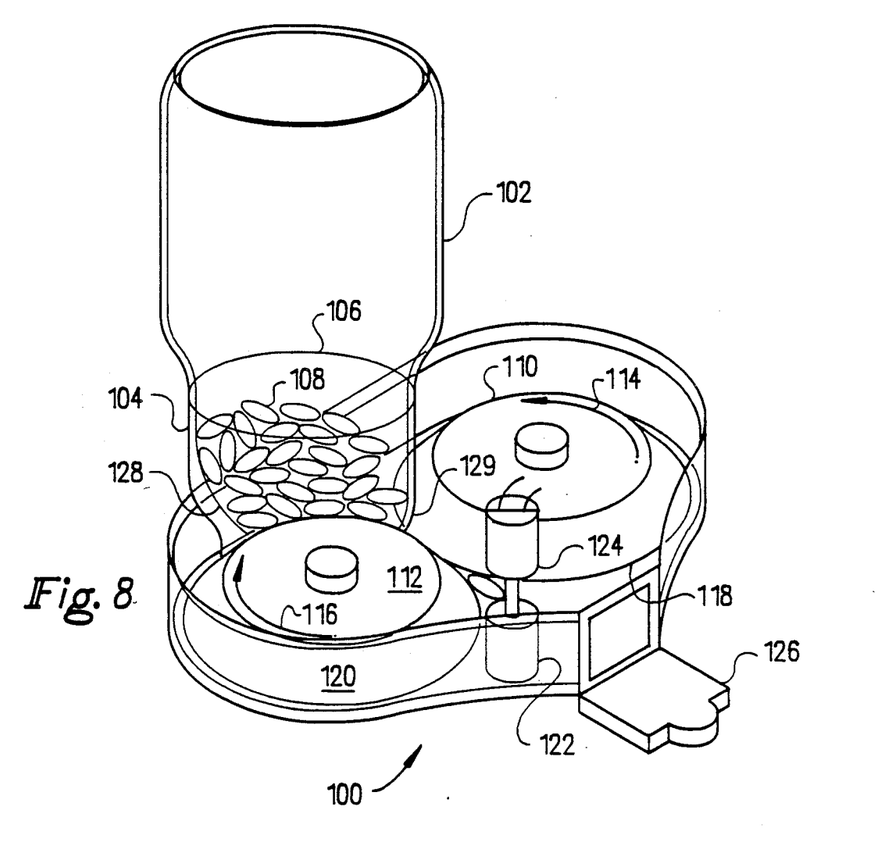
FIG. 8 is a perspective view of a second embodiment of the dispenser wherein the movable compressible isolator comprises a pair of wheels.

FIG. 8 shows a perspective view of the second embodiment of the present invention. A dispenser 100 including a receptacle 102 is connected to a reservoir 104 by means of a screw thread or the like, indicated by a ring 106. The objects to be dispensed, such as pills, tablets, capsules or the like 108, are loosely contained in the receptacle 102 and the reservoir 104. Loose containment is an important advantage of the dispenser, since the personnel cost associated with filling a dispenser can be significant, and allowing a random order in the objects being dispensed significantly reduces these costs. The objects are removed from the reservoir 104 by an isolator comprising a pair of compressible wheels 110, 112 which rotate in the direction indicated by arrows 114, 116. The wheels 110, 112 each rotate about parallel axes spaced such that the peripheral surface of each wheel 110, 112 contact the peripheral surface of the other wheel 110, 112 along a surface where the surface of each wheel compresses the other. The wheels 110, 112 each have peripheral coverings 118, 120 fashioned from a compressible material, preferably a synthetic elastomer such as polyurethane. This synthetic elastomer will be described as "foam rubber" in the following description. The foam rubber is of a consistency that allows it to be impermeable to small particles of medication which might be ablated from the medication when it passed between the coverings 118, 120 or when medication units rub together. Alternatively, the wheel coverings 118, 120 could be made from brushes or constructed with brush surfaces. The individual bristles of these brushes could be made of relatively hard but bendable materials such a rubber or rubber like material. The bending of these bristles would create a depression in the brush so that the brush functioned like compressible material. A further alternative wheel coverings 118, 120 could be fashioned of fabric like the material in a rug or a towel.

The coverings 118 and 120 form a passageway that carries the pill 108 from the reservoir 104, past a light, 122 and photodetector 124, to the exterior of the dispenser through a sealing cover 126. The dispenser is tilted so that the medication units will move by the force of gravity towards the cover 126 and out of the dispenser when the cover 126 is opened.

The objects in the reservoir 104 are guided to one edge of the reservoir 104 by an inclined posterior surface 128. This surface 128 guides the pills 108 to the coverings 118, 120 which form a "V" where the pills 108 make contact with the coverings 118, 120. The edges of the reservoir 104 extend to the floor of the dispenser 100, except for an area overlying the junction of the coverings 118, 120 where an opening allows the pills 108 to be moved out of the reservoir 104. At this opening, a projection 129 extends down between the coverings 110, 112 to form a restricted space such that only one pill 108 is allowed to pass through at a time.

The wheels 110, 112 can be rotated either by a motor or by a hand-crank so that coverings 118, 120 transport the pill 108. Subsequently, the pill 108 passes between a light source 122 and a photodetector 124, which detects the presence of the pill. The light source 122 and the detector 124 are carefully positioned so that a pill 108 will be detected only after it is no longer captured by the coverings 118, 120, and will be free to be removed from the dispenser. To adapt the dispenser to different size and shape objects, the light source 122 and the detector 124 are movable so that a person filling the dispenser can adjust them to not detect an object until it is past the coverings 118, 120. A counting and recording circuit (not shown) attached to the photodetector 124 can be used to count and record the medication dispensed. A control circuit or system (not shown) attached to the counting and recording circuit can be used to prevent further dispensing of medication by stopping the motor or activating a brake (not shown) which is attached to the wheels 110, 112. A timer or clock (not shown) can also be used by the control system to allow dispensing only at predetermined times and by the counting and recording circuit to determine when medication is removed.

An alternative method of adjusting for different size and shape objects is to place the detector 124 as close as possible to the coverings elements 118, 120. The control system is then programmed to continue slowly the rotation of the wheels 110, 112 after the detector 124 has detected the object until the wheels 110, 112 have turned far enough that the object has completely exited from the coverings 118, 120. This adjustment may be made for each different size of object.

The control system is primarily used to control how many objects are dispensed by stopping the rotation of the wheels 110, 112 as soon as a selected number of objects have passed the detector 124. If the wheels are turned by a motor, the rotation can be stopped by stopping the motor. If the wheels are turned by a hand-crank, the rotation can be stopped by an electromechanical brake activated by the control system. Alternatively, an electrically activated clutch (not shown) could be placed between the motor or the hand-crank and the wheels. This clutch would be activated by the control system until a predetermined quantity of objects had been dispensed, and then the clutch would be deactivated to stop the turning of the wheels. The wheels would stop rotating due to the friction between the wheels and the floor of the dispenser with which they are in contact.

The control system could also be interconnected to a computer that would determine the proper time for dispensing, as well as the proper number of objects to dispense. Also, the computer could be used to record information such as the time and quantity of medication that had been removed.

If the wheels 110, 112 are driven by a motor, the control system could reverse the direction of the motor to clear any jam in the system. If the wheels 110, 112 are driven by a hand-crank, the crank would also allow reversal of direction to clear a jam.

Figure 9:
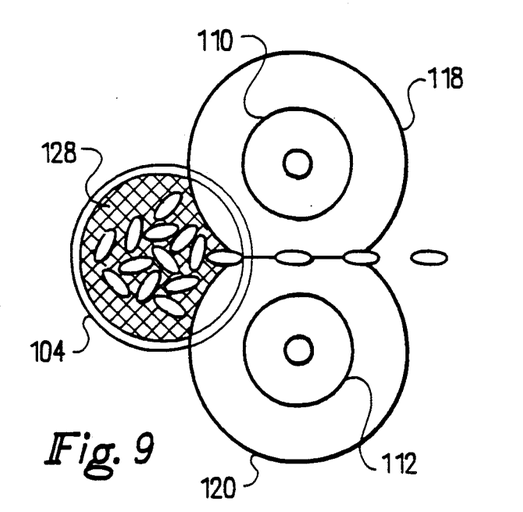
FIG. 9 is a top view of the dispenser shown in FIG. 8 showing medication units being dispensed separately.

FIG. 9 shows a series of pills 128 passing through the passageway formed by the coverings 118, 120. This figure also illustrates that the passageway forms a restriction that generally prevents more than one pill from being captured between the coverings 118, 120 at one time.

Figure 10:
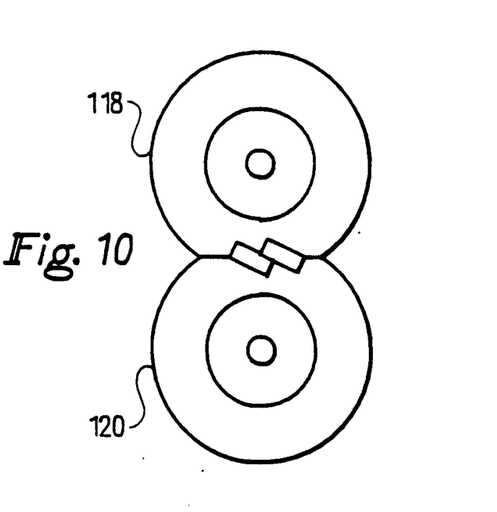
FIG. 10 is a top view of the dispenser shown as FIG. 8 with two medication units being dispensed together.

FIG. 10 illustrates a situation where two pills 128 are captured between the coverings 118, 120, one slightly ahead of the other, but the pills 128 are not completely separated. This occurs most often with tablets. When two pills 128 are captured together, one is nearly always slightly ahead of the other, in the manner shown in FIG. 10. Because of this condition, medication units usually exit the wheels 118, 120 separately and will be individually detected and counted.

Figure 11:
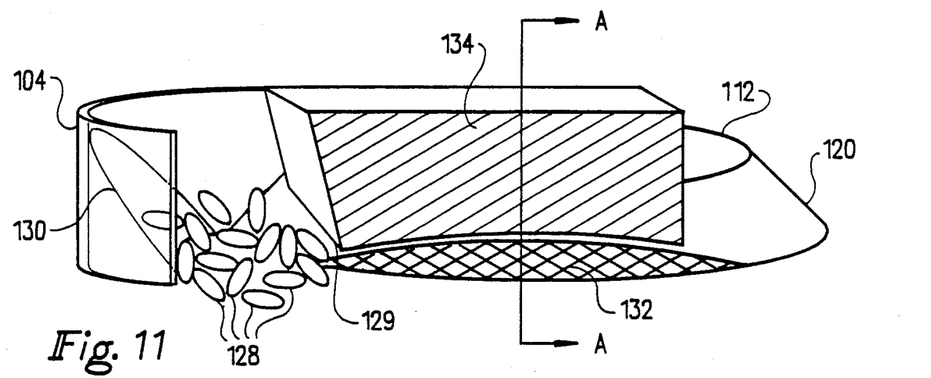
FIG. 11 is a side view of the passageway utilized on the dispenser shown in FIG. 8.
Figure 12:
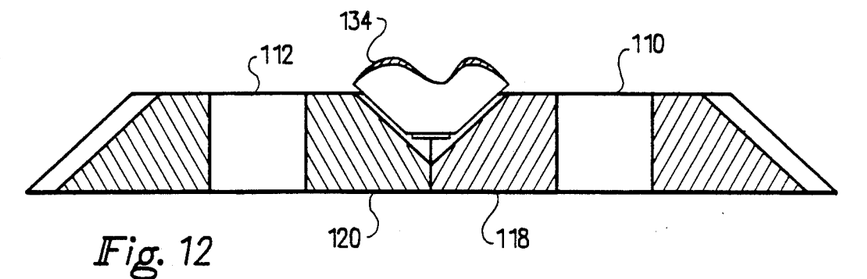
FIG. 12 is a sectional end view of the passageway shown in FIG. 11.

FIG. 11 shows a side view of the passageway utilized in the dispenser 100 shown in FIG. 8, illustrating the reservoir 104 with the included posterior surface 130, and illustrating pills 128 ready to be dispensed. One wheel 112 and its covering 120 is shown, and the compression of this covering with the covering of the other wheel (not shown) is illustrated by the area 132. A cover 134 extends over the compression area 132 to form the passageway through which the pills 128 must pass as they are being dispensed to prevent the occasional occurrence of a pill prematurely escaping capture between the two wheels by moving upward. This passageway is just large enough to allow a single pill 128 to pass through, and thus keeps the pills 128 between the two coverings 118, 120 as the coverings 118, 120 carry the pills 128 through the passageway FIG. 12 shows a sectional end view of the passageway shown in FIG. 11 at the level of line A—A and illustrates that the cover 134 is formed in a "V" shape to mate with the included surfaces of the coverings 118, 120.

With the addition of an audible output device, such as a beeper, the control system could notify the patient when medication should be taken. Also a visual output device, such as a liquid crystal display, could be used to notify the patient that medication should be taken and give instructions as to what should be taken.

Figure 13:
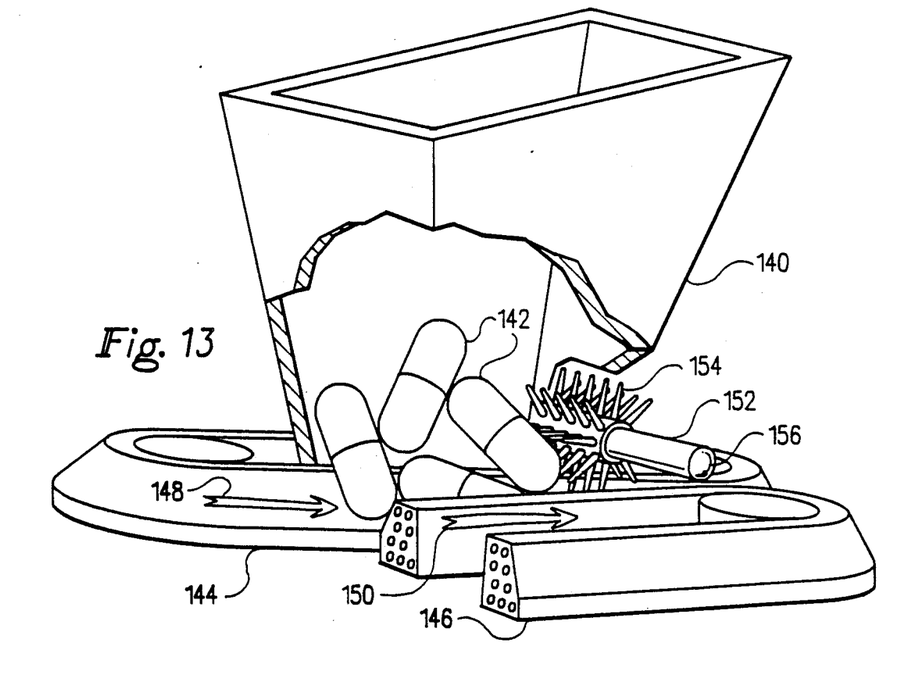
FIG. 13 is a perspective view of a third embodiment wherein belts serve as the compressible movable isolator, which dispenser includes an anti-jamming device.

It is desirable to keep the size of the dispenser small as possible. One way to reduce the size is to replace the wheels 110, 112 with belts made of compressible material. FIG. 13 illustrates such a dispenser, which includes a reservoir 140 containing the capsules 142 to be dispensed. The bottom of the reservoir 140 is open to allow the capsules 142 to be in contact with a pair of translatable, endless belts 144, 146 fashioned from foam rubber. The belts 144, 146 move in the direction shown by arrows 148 and 150 to dispense the capsules 142. The medication units 142 must pass a restricted area at the bottom of the reservoir 140 formed by the belts 144, 146 and by an anti-jamming brush 152. This brush 152 possesses radially extending bristles 154 which rotate in the direction of arrow 156 to push back any medication unit 14 that is not completely surrounded by the belts 144, 146. The anti-jamming brush is positioned by a person filling the dispenser so that those capsules that are completely surrounded by the belts 144, 146 are not touched by the bristles 154, but those capsules 142 that are only partially surrounded by the belts 144, 146 are contacted and pushed back by the bristles 154 Such a use of an anti-jamming brush further reduces the possibility that a capsule 142 not completely surrounded by the belts 144, 146 can block the restricted area leading out of the dispenser. In this manner, only a single capsule 142 is dispensed at a time.

Another way to make the dispenser as small as possible is to make one covering or belt of low friction non-compressible material such as Teflon. With this version of the dispenser, the depression formed in the compressible materials of the other covering or belt would propel the object along the low friction non-compressible covering or belt.

Figure 14:
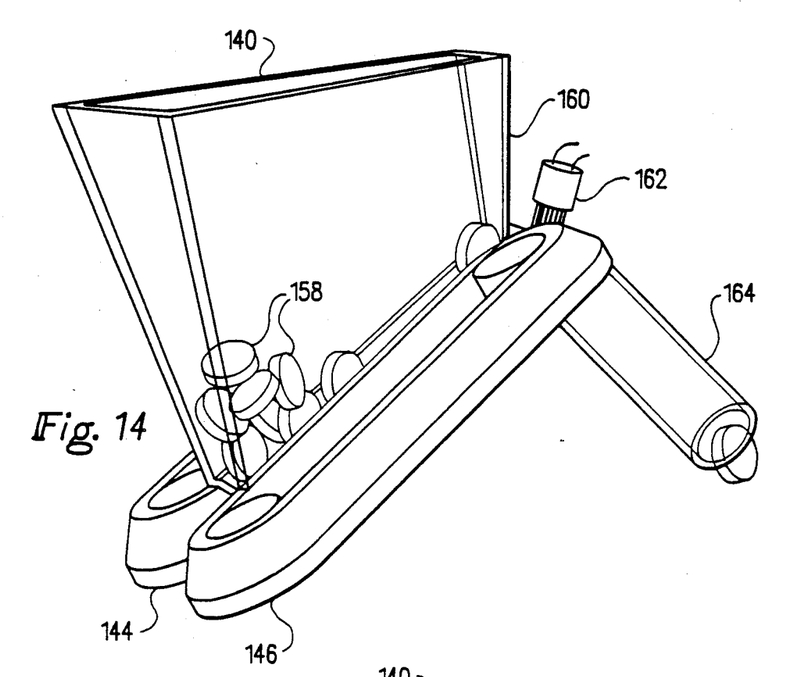
FIG. 14 is another perspective view of the third embodiment illustrating the upward inclination of the belts to facilitate single medication unit isolation.
Figure 15:
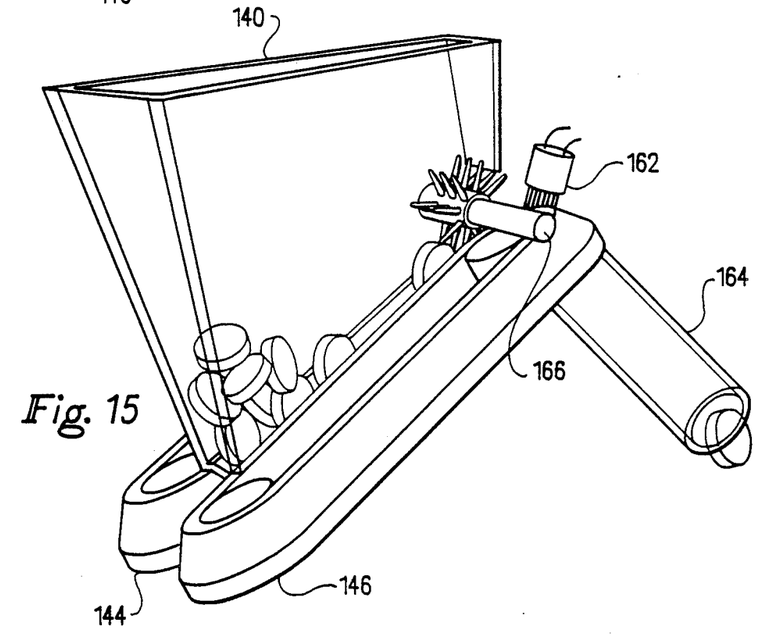
FIG. 15 is a perspective view of the dispenser shown in FIG. 14 provided with an anti-jamming mechanism at the entrance to the passageway.

FIG. 14 shows an alternative way of orienting the device of FIG. 13 wherein the belts 144, 146 are inclined upward, and the restriction is formed by one lower edge 160 of one side of the reservoir 140. In this figure, pills 158 are captured between the belts 144, 146 and are moved upward until they reach the edge 160 of the reservoir 140. Any pill that is not completely surrounded by the belts 144, 146 will strike the edge 160 and will be dislodged from partial capture by the belts 144, 146, thereby causing the pill to fall back into the reservoir 140 by the force of gravity, especially if the restricted space is located above the upper surface level of medication units in the reservoir 140. After passing the edge 160, the pill is detected by a detector 162 before being guided to the exterior of the dispenser by a tube 164. If necessary, an anti-jamming device can be added to the dispenser of FIG. 14, as shown in FIG. 15.

Figures 16, 17, 18:
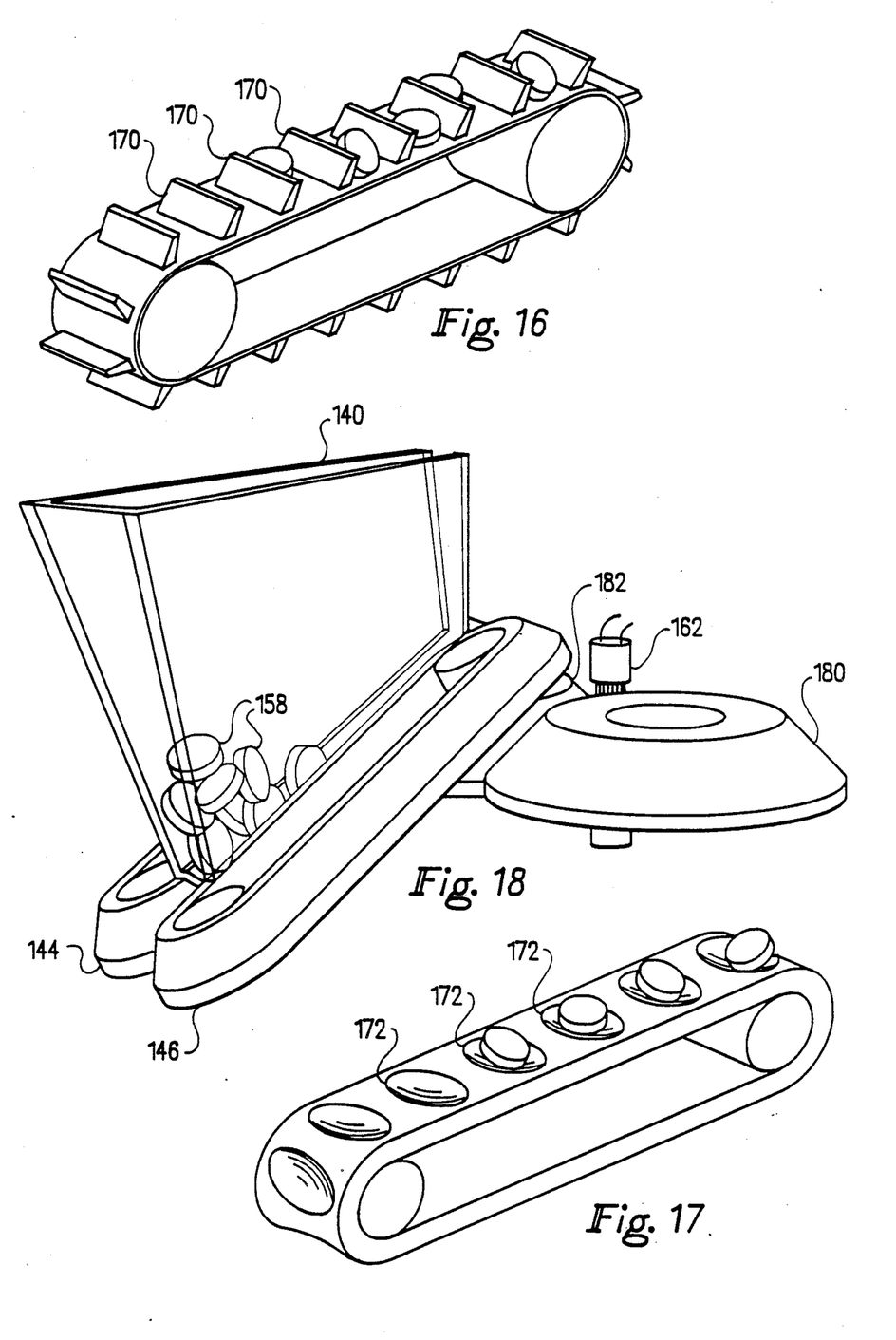
FIG. 16 is a schematic perspective illustration of a tractor or paddle wheel type belt in the dispenser.
FIG. 17 is a schematic perspective illustration that utilizes a belt provided with a series of pill sized depressions that may be utilized in the dispenser device.
FIG. 18 shows the device with two pairs of cooperating compressible movable isolator structures.

FIG. 16 shows a single translatable, endless belt, having a tread similar to a toy tractor, which could replace the belts 144, 146 of FIG. 14. The distance between the tread feet 170 is selected to match the size of the object being dispensed so that only one object can rest between adjacent tread feet 170. FIG. 17 shows a translatable, endless belt having depressions 172, to contain the pills. The size of the depressions 172 is selected to conform to the size of the objects being dispensed so that only one pill can rest within a depression 172. These belts could be made with either compressible material or non-compressible material.

After leaving the elevated end of a belt provided with treads or depressions, the medication unit could be detected by a detector and guided into a tube that leads to the exterior of the device, if such a detector and tube were provided and placed in the same manner as is shown in FIG. 14. If necessary, an anti-jamming device could also be provided to provide for separation of medication units in the unlikely event that two medication units were propelled together with the treads or depressions on the belts.

FIG. 18 demonstrates another dispenser to achieve separation of medication in the event that two or more medication units are discharged together from the belts. As medication units exit the belts 144, 146, the medication units drop onto a set of wheels 180, 182 similar to the wheels 110, 112 shown in FIGS. 8 through 12. Since it would be extremely unlikely that two medication units would stay physically in contact with one another in the process of dropping and since the units would tend to bounce when they hit the wheels 110, 112, probably in different directions, the wheels would most likely capture the medication units separately from one another. In addition the wheels 110, 112 could be designed to have a peripheral speed greater than the linear speed of the belts 144, 146 to achieve greater separation of the medication units as they exit the dispenser.

If the two sets of compressible structures (the belts and the wheels) moved at the same speed, the dropping of two medication units together from the belts might lead to an excessive number of medication units piling up on the wheels over a period of time. To avoid this problem an additional light beam and detector could be placed at the area between the belts and the wheels to detect any medication units falling from the belts to the wheels. With this construction, the control system would stop the belts as soon as the medication unit had been detected leaving the belts, but would continue to move the wheels until a medication unit was detected leaving the wheels by detector 162. In addition, to adapt to the possibility where two medication units are captured by the wheels, the following steps would be carried out the next time medication units were removed from the dispenser. The control system would restart the motion of the wheels and not restart the motion of the belts until any medication unit captured by the wheels would have been moved to the point where it would be freed from the wheels. If at that time no medication unit was detected by detector 162, the control system would restart the belts and continue to move them until a medication unit was detected dropping from the belts to the wheels.

If the instructions in the control system called for the dispensing of two medication units substantially at the same time, the control system would continue to move the wheels while not restarting motion of the belts after one medication unit had been detected leaving the wheels until the wheels had moved far enough to remove all medication units captured by the wheels. If a second medication unit was detected leaving the wheels, the belts would not be restarted. If a second medication unit was not detected leaving the wheels the belts would be restarted, and the operation of the dispenser would be continued as outlined in the preceding paragraph.

It will be appreciated that various combinations of wheels and belts that are either compressible or non-compressible could be used with the type of dispenser shown in FIG. 18 in which a medication unit falls by the force of gravity between one movable structure and another movable structure. For instance the medication unit could fall from the compressible belts in FIG. 18 into the trough of a non-compressible "V" shaped belt, which would move the medication units out of the dispenser. If such a belt moved in a horizontal plane it would not be necessary for it to have treads or depressions to move the medication units.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A dispenser for dispensing substantially non-compressible solid objects one at a time comprising:

a receptacle having a substantially hollow interior for storing a plurality of objects to be dispensed, said receptacle having an opening through a first wall thereof;

a passageway extending from said opening to the exterior of said dispenser;

a pair of cooperating structures disposed in said passageway, at least one of said cooperating structures moveable relative to the other cooperating structure whereby movement of said moveable structure carries said objects through said passageway and between said structures substantially one at a time;

said at least one movable structure at least partially formed from a compressible material, said compressible material having dimensions sufficiently larger than dimensions of one of said objects such that a discrete indentation is formed in said compressible material by said object, said indentation possessing a surface disposed behind said object relative to the direction of movement of said object through said passageway thereby facilitating movement of said object through said passageway;

moving means for moving said movable structure; and detecting means for detecting the passage of each said object past a predefined point in said passageway.

2. The dispenser of claim 1 wherein said objects are uniform in size.

3. The dispenser of claim 1 further comprising counting means responsive to said detecting means for counting the number of objects detected by said detecting means.

4. The dispenser of claim 1 further comprising means for selectively stopping the movement of said movable structure such that said objects cannot be carried through said passageway.

5. The dispenser of claim 3 further comprising controlling mean for activating said stopping means when said counting means indicates that a predetermined number of objects has been counted.

6. The dispenser of claim 1 further comprising means for recording the time when said detecting means detects the passage of each said object.

7. The dispenser of claim 3 further comprising means for recording the quantity of objects counted by said counting means.

8. The dispenser of claim 1 further comprising sealing means for substantially preventing the passage of moisture into said dispenser when said objects are not being dispensed.

9. The dispenser of claim 1 wherein said compressible movable structure moves substantially in a forward direction and a reverse direction and further comprising means for reversing the direction of movement of said movable structure whereby any object partially lodged in said opening may be dislodged.

10. The dispenser of claim 1 wherein said detecting means comprises:

a light source for producing a beam of light located on one side of said passageway and oriented to project said light beam across said passageway; and means for detecting said light beam located on a side of said passageway opposite said light source and oriented to detect said light beam being projected from said light source whereby any object passing through said passageway will interrupt said light beam.

11. The dispenser of claim 1 wherein said compressible movable structure comprises:

a substantially non-compressible base; and a compressible covering overlying said base.

12. The dispenser of claim 1 wherein said cooperating structures are each moveable relative to the other cooperating structure and wherein each said structure is at least partially fashioned of compressible material and wherein said compressible material is compressibly indented by at least one of said non-compressible objects when said object is carried between said structures, whereby said indentation assists in moving said non-compressible object.

13. The dispenser of claim 12 wherein each of said pair of movable structures comprises a pair of cooperating, opposing, rotatable wheels, a peripheral surface of one wheel substantially tangentially engaging the peripheral surface of the other wheel, said wheels adapted to capture an object substantially in the region of tangential engagement, whereby rotation of said wheels carries said captured object through said passageway.

14. The dispenser of claim 12 wherein each of said pair of movable structures comprises partial segments of a pair of cooperating, opposing, rotatable wheels, a peripheral surface of one wheel substantially tangentially engaging the peripheral surface of the other wheel, said wheels adapted to capture an object substantially in the region of tangential engagement, whereby rotation of said wheels carries said captured object through said passageway.

15. The dispenser of claim 12 wherein each of said pair of movable structures comprises a pair of cooperating, translating, endless belts adapted to capture an object between said belts, whereby translation of said belts carries said objects through said passageway.

16. The dispenser of claim 2 wherein said movable structure comprises a rotatable wheel and wherein said other cooperating structure possesses a substantially non-compressible surface possessing a low coefficient of friction, said wheel positioned so that a peripheral surface of said wheel substantially tangentially engages said non-compressible surface, said wheel and said non-compressible surface adapted to capture an object substantially in the region of tangential engagement, whereby rotation of said wheel carries said captured object through said passageway.

17. The dispenser of claim 2 wherein said movable structure comprises a partial segment of a wheel and wherein other cooperating structure possesses a substantially non-compressible surface possessing a low coefficient of friction said wheel segment positioned so that a peripheral surface of said wheel segment substantially tangentially engages said non-compressible surface, said segment of said wheel and said non-compressible surface adapted to capture an object substantially in the region of tangential engagement, whereby rotation of said wheel segment carries said captured object through said passageway.

18. The dispenser of claim 2 wherein said movable structure comprises a translating endless belt and wherein said other cooperating structure possesses a substantially non-compressible surface possessing a low coefficient of friction, said belt in contact with said non-compressible surface, said belt and said non-compressible surface adapted to capture an object there between, whereby translation of said belt carries said captured object through said passageway.

19. The dispenser of claim 15 wherein each of said belts comprises foam rubber.

20. The dispenser of claim 18 wherein said belt comprises foam rubber.

21. The dispenser of claim 11 wherein said covering comprises bristles.

22. The dispenser of claim 21 wherein said bristles comprise substantially flexible material.

23. The dispenser of claim 22 wherein said bristles comprise rubber.

24. The dispenser of claim 1 further comprising means for guiding said objects from said receptacle to said passageway.

25. The dispenser of claim 24 wherein said guiding means substantially prevents more than one of said objects from passing from said receptacle and into said passageway simultaneously.

26. The dispenser of claim 1 wherein each of said cooperating structures extends at least partially into said receptacle.

27. The dispenser of claim 26 wherein said opening, said movable structure, and said other cooperating structure form a restricted space that substantially prevents more than one of said objects from passing through said restricted space simultaneously.

28. The dispenser of claim 1 wherein said opening is located horizontally above the upper level of the objects in said receptacle.

29. The dispenser of claim 27 wherein said opening includes an anti-jamming device possessing at least one surface movable in a direction different from the movement of objects by said movable structure whereby movement of said surface causes objects not completely captured between said movable structure and said other cooperating structure to move back into said receptacle.

30. A dispenser according to claim 1 wherein said receptacle stores said objects in a loose and non-ordered state.

31. A dispenser according to claim 1 wherein said objects comprise medication.

32. A dispenser for dispensing solid objects one at time comprising:
 receptacle for storing a plurality of objects to be dispensed;
 a passageway extending from said receptacle to an exterior of said dispenser;
 a pair of relatively movable cooperating structures dimensioned to pass said objects therebetween disposed in said passageway for moving said objects through said passageway substantially one at a time;
 at least one of said cooperating structures at least partially formed from compressible material sufficiently large compared with the size of one of said objects being dispensed such that a discrete depression is formed by said object in said compressible material, said indentation possessing a surface disposed behind said object relative to the direction of movement of said object through said passageway thereby facilitating movement of said object through said passageway; and
 detecting means for detecting passage of each of said objects past a predefined point in said passageway.

33. The dispenser of claim 32, wherein said means disposed in said passageway for moving said objects comprises a pair of relatively movable cooperating structures.

34. The dispenser of claim 33, wherein said cooperating structures are dimensioned to pass said objects therebetween.

35. The dispenser of claim 34, wherein said cooperating structures are dimensioned for frictional engagement with said objects.

36. The dispenser of claim 32, wherein said objects are uniform in size.

37. The dispenser of claim 36, wherein the other cooperating structure is non-compressible and stationary and includes a surface having a low coefficient of friction in contact with said movable cooperating structure, in which said pair of cooperating structures are positioned to capture an object in the area of contact engagement, whereby movement of said movable cooperating structure carries said captured object through said passageway.

38. The dispenser of claim 37, wherein said movable structure comprises a rotatable wheel positioned so that a peripheral surface of said wheel substantially tangentially engages said non-compressible surface, said wheel and said non-compressible surface adapted to capture an object substantially in the region of tangential engagement, whereby rotation of said wheel carries said captured object through said passageway.

39. The dispenser of claim 37, wherein said movable structure comprises a partial segment of a rotatable wheel positioned so that a peripheral surface of said partial segment substantially tangentially engages said non-compressible surface, said partial segment and said non-compressible surface adapted to capture an object substantially in the region of tangential engagement, whereby rotation of said partial segment carries said captured object through said passageway.

40. The dispenser of claim 37, wherein said movable structure comprises a translating endless belt in contact with said non-compressible surface, said belt and said non-compressible surface adapted to capture an object therebetween, whereby translation of said belt carries said captured object through said passageway.

41. The dispenser of claim 32, wherein said compressible material comprises foam rubber.

42. The dispenser of claim 36, wherein said at least one of said cooperating structures comprises:
 a substantially non-compressible base; and
 a compressible cover overlying said base.

43. The dispenser of claim 32, further comprising means for recording the time when said detecting means detects the passage of each said object.

44. The dispenser of claim 32, further comprising counting means responsive to said detecting means for counting the number of objects detected by said detecting means.

45. The dispenser of claim 44, further comprising means for recording the quantity of objects counted by said counting means.

46. The dispenser of claim 32, wherein said detecting means comprises:
 a light source for producing a beam of light located on one side of said passageway and oriented to project said light beam across said passageway; and
 means for detecting said light beam located on a side of said passageway opposite said light source and oriented to detect said light beam being projected from said light source, whereby any object passing through said passageway will interrupt said light beam.

47. The dispenser of claim 32, further comprising means for guiding said objects from said receptacle to said passageway.

48. The dispenser of claim 47, wherein said guiding means is configured for substantially preventing more than one of said objects from passing from said receptacle and into said passageway simultaneously.

49. The dispenser of claim 32, wherein said receptacle stores said objects in a loose and non-ordered state.

50. The dispenser of claim 32, wherein said objects comprise medication.

51. The dispenser of claim 32, wherein said means disposed in said passageway for moving said objects comprises:
   a pair of relatively movable cooperating structures;
   means for moving at least one of said cooperating structures; and
   stopping means for selectively stopping the movement of said at least one cooperating structure to prevent said objects from being carried through said passageway.

52. The dispenser of claim 51, further comprising:
   counting means responsive to said detecting means for counting the number of objects detected by said detecting means; and
   control means for activating said stopping means when said counting means indicates that a predetermined number of objects has been counted.

53. The dispenser of claim 32, further comprising sealing means for substantially preventing the passage of moisture into said dispenser when said objects are not being dispensed.

54. The dispenser of claim 32, wherein said means disposed in said passageway for moving said objects comprises:
   a pair of relatively movable cooperating structures;
   means for moving at least one of said cooperating structures in a forward direction and in a reverse direction, whereby any object partially lodged in said passageway may be dislodged.

55. The dispenser of claim 32, wherein said means disposed in said passageway for moving said objects comprises cooperating, opposing, rotatable partial segments of a pair of wheels, a peripheral surface of one segment substantially tangentially engaging the peripheral surface of the other segment, said segments adapted to capture an object substantially in the region of tangential engagement, whereby rotation of said segments carries said captured object through said passageway.

56. The dispenser of claim 55, wherein each of said segments are at least partially formed from a compressible material and are dimensioned to be compressibly indented by at least one of said objects when said object is passed therebetween, whereby said indentations assist in moving said object.

57. The dispenser of claim 56, wherein said compressible material comprises foam rubber.

58. The dispenser of claim 56, wherein said compressible material comprises bristles.

59. The dispenser of claim 32, further comprising a funnel disposed for guiding objects from said receptacle into said passageway.

60. The dispenser of claim 32, further comprising a one-way gate disposed adjacent an outlet end of said passageway configured to permit movement of said objects out of said dispenser.

61. The dispenser of claim 57, wherein said one-way gate is formed by two cooperating thin flexible plastic leaves configured to separate under the weight of one of said objects.

62. The dispenser of claim 32, wherein said means disposed in said passageway for moving said objects comprises a pair of cooperating, opposing rotatable wheels, a peripheral surface of one wheel substantially tangentially engaging the peripheral surface of the other wheel, said wheels adapted to capture an object substantially in the region of tangential engagement, whereby rotation of said wheels carries said captured object through said passageway.

63. The dispenser of claim 62, wherein at least one of said wheels is at least partially formed from a compressible material and is dimensioned to be compressibly indented by at least one of said objects when said object is passed therebetween, whereby said indentation assists in moving said object.

64. The dispenser of claim 63, wherein said compressible material comprises foam rubber.

65. The dispenser of claim 63, wherein said compressible material comprises bristles.

66. The dispenser of claim 32, wherein said means disposed in said passageway for moving said objects comprises a pair of cooperating, translating endless belts, whereby translation of said belts carries said objects through said passageway.

67. The dispenser of claim 66, wherein at least one of said belts is at least partially formed from a compressible material and is dimensioned to be compressibly indented by at least one of said objects when said object is passed therebetween, whereby said indentation assists in moving said object.

68. The dispenser of claim 67, wherein said compressible material comprises foam rubber.

69. The dispenser of claim 67, wherein said compressible material comprises bristles.

70. The dispenser of claim 32, further comprising an anti-jamming device possessing at least one surface movable in a direction different from the movement of objects by said means disposed in said passageway.

71. The dispenser of claim 32, wherein said means disposed in said passageway for moving said objects comprises a first pair of cooperating structures, at least one of said first cooperating structures moveable relative to the other first cooperating structure, whereby movement of said moveable first cooperating structure carries said objects through a first portion of said passageway;
   a second pair of cooperating structures disposed in said passageway, at least one of said second cooperating structures moveable relative to the other second cooperating structure, whereby movement of said moveable second cooperating structure carries objects through a second portion of said passageway after said objects have been carried through said passageway by said moveable first cooperating structure;
   first moving means for moving said first cooperating structure; and
   second moving means for moving said second cooperating structure.

72. The dispenser of claim 71, in which at least one of said movable structures in each pair of cooperating structures is at least partially fashioned of compressible material and wherein said compressible material is compressibly indented by at least one of said objects when said object is carried between said cooperating structures, whereby said indentation assists in moving said object.

73. The dispenser of claim 72, wherein each of said cooperating structures is movable relative to and in contact with the other cooperating structure in each pair of cooperating structures, whereby movement of either structure in each pair of cooperating structures causes movement of the other cooperating structure.

74. The dispenser of claim 73, wherein each cooperating structure is at least partially fashioned of compressible material.

75. The dispenser of claim 72, wherein the other cooperating structure in each pair of cooperating structures is non-compressible and stationary and includes a surface having a low coefficient of friction in contact with said movable cooperating structure, in which said cooperating structure pairs are each positioned to capture an object in the area of contact engagement whereby movement of said movable cooperating structure in each pair of cooperating structures carries said captured object through said passageway.

76. The dispenser of claim 71, further comprising counting means responsive to said detecting means for counting the number of objects detected by said detecting means.

77. The dispenser of claim 76, further comprising means for recording the quantity of objects counted by said counting means.

78. The dispenser of claim 71, further comprising means for selectively stopping the movement of each of said movable structures such that said objects cannot be carried through said passageway.

79. The dispenser of claim 72, wherein said compressible movable structures each comprise:
a substantially non-compressible base; and
a compressible covering overlying said base.

80. The dispenser of claim 73, wherein each of said pair of cooperating structures comprises a pair of cooperating, opposing, rotatable wheels, a peripheral surface of one wheel substantially tangentially engaging the peripheral surface of the other wheel, said wheels adapted to capture an object substantially in the region of tangential engagement, whereby rotation of said wheels carries said captured object through said passageway.

81. The dispenser of claim 73, wherein each of said pair of cooperating structures comprises partial segments of a pair of cooperating, opposing rotatable wheels, a peripheral surface of one wheel substantially tangentially engaging the peripheral surface of the other wheel, said wheels adapted to capture an object substantially in the region of tangential engagement, whereby rotation of said wheels carries said captured object through said passageway.

82. The dispenser of claim 73, wherein each of said pair of cooperating structures comprises a pair of cooperating, translating, endless belts adapted to capture an object between said belts, whereby translation of said belts carries said objects through said passageway.

83. The dispenser of claim 75, wherein each of said movable structures comprises a rotatable wheel positioned so that a peripheral surface of sad wheel substantially tangentially engages said non-compressible surface, said wheel and said non-compressible surface adapted to capture an object substantially in the region of tangential engagement, whereby rotation of said wheel carries said captured object through said passageway.

84. The dispenser of claim 75, wherein each of said movable structures comprises a partial segment of a wheel positioned so that a peripheral surface of said wheel segment substantially tangentially engages said non-compressible surface, said segment of said wheel and said non-compressible surface adapted to capture an object substantially in the region of tangential engagement, whereby rotation of said wheel segment carries said captured object through said passageway.

85. The dispenser of claim 75, wherein each of said movable structures comprises a translating endless belt in contact with said non-compressible surface, said belt and said non-compressible surface adapted to capture an object therebetween, whereby translation of said belt carries said captured object through said passageway.

86. A dispenser for dispensing solid objects one at a time, comprising:
a receptacle for storing a plurality of objects to be dispensed;
a passageway extending from said receptacle to an exterior of said dispenser;
a pair of relatively, movable cooperating structures disposed in said passageway, said cooperating structures having contacting surfaces;
means for moving at least one of said cooperating structures; and
said contacting surface of at least one of said cooperating structures at least partially fashioned from a compressible material and dimensioned relative to one of said objects to be dispensed such that said object forms a discrete depression in said compressible material as said object is passed between said cooperating structures, said discrete depression possessing at least one surface located behind said object relative to the motion of said object through said passageway, whereby said surface propels said object through said passageway.

87. The dispenser of claim 86, further comprising stopping means for selectively stopping the movement of said at least one cooperating structure to prevent said objects from being carried through said passageway.

88. The dispenser of claim 86, further comprising guiding means for substantially preventing more than one of said objects from passing from said receptacle and into said passageway simultaneously.

89. The dispenser of claim 86, wherein said cooperating structures comprise opposing, rotatable partial segments of a pair of wheels, a peripheral surface of one segment substantially tangentially engaging the peripheral surface of the other segment, said segments adapted to capture an object substantially in the region of tangential engagement, whereby rotation of said segments carries said capture object through said passageway.

90. The dispenser of claim 86, wherein said cooperating structures comprise a pair of opposing rotatable wheels, a peripheral surface of one wheel substantially tangentially engaging the peripheral surface of the other wheel, said wheels adapted to capture an object substantially in the region of tangential engagement, whereby rotation of said wheels carries said captured object through said passageway.

91. The dispenser of claim 86, where said cooperating structures comprise a pair of translating endless belts, whereby translation of said belts carries said objects through said passageway.

92. The dispenser of claim 86, further comprising detecting means for detecting passage of each of said objects past a predefined point in said passageway.

93. The dispenser of claim 86, wherein said detecting means comprises:
a light source for producing a beam of light located on one side of said passageway and oriented to project said light beam across said passageway; and
means for detecting said light beam located on a side of said passageway opposite said light source and oriented to detect said light beam being projected from said light source, whereby any object passing through said passageway will interrupt said light beam.

94. The dispenser of claim 92, further comprising means for recording the time when said detecting means detects passage of each said object.

95. The dispenser of claim 92, further comprising counting means responsive to said detecting means for counting the number of objects detected by said detecting means.

96. The dispenser of claim 95, further comprising means for recording the quantity of objects counted by said counting means.

97. The dispenser of claim 86, wherein said receptacle stores said objects in a loose and non-ordered state.

98. The dispenser of claim 86, wherein said compressible material comprises foam rubber.

99. The dispenser of claim 87, wherein said compressible material comprises bristles.

100. The dispenser of claim 87, further comprising a one-way gate disposed adjacent an outlet end of said passageway configured to permit movement of said objects out of said dispenser.

* * * * *